(12) United States Patent
Lim et al.

(10) Patent No.: US 8,305,984 B2
(45) Date of Patent: Nov. 6, 2012

(54) RESOURCE ALLOCATION METHOD, MAP CONFIGURATION METHOD, AND RESOURCE ALLOCATION INFORMATION TRANSMISSION METHOD IN MOBILE COMMUNICATION SYSTEM

(75) Inventors: Kwang-Jae Lim, Daejeon (KR); Chul-Sik Yoon, Seoul (KR); Jee-Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 12/664,229

(22) PCT Filed: Mar. 12, 2008

(86) PCT No.: PCT/KR2008/001402
§ 371 (c)(1),
(2), (4) Date: Dec. 11, 2009

(87) PCT Pub. No.: WO2008/153264
PCT Pub. Date: Dec. 18, 2008

(65) Prior Publication Data
US 2010/0232398 A1    Sep. 16, 2010

(30) Foreign Application Priority Data
Jun. 13, 2007   (KR) .................. 10-2007-0057836

(51) Int. Cl.
*H04W 4/00* (2009.01)
*H04J 3/00* (2006.01)
(52) U.S. Cl. .................. 370/329; 370/280; 370/336

(58) Field of Classification Search .................. None
See application file for complete search history.

(56) References Cited

U.S. PATENT DOCUMENTS
2006/0153112 A1    7/2006   Lim et al.
(Continued)

FOREIGN PATENT DOCUMENTS
EP    1 809 064    7/2007
(Continued)

OTHER PUBLICATIONS
Hongfei Du et al., "Advanced Radio Resource Allocation Strategies for Satellite Digital Multimedia Broadcast (SDMB) System," $2^{nd}$ International Symposium on Wireless Communication Systems (2005), Sep. 5-7, 2005, pp. 749-753.

*Primary Examiner* — Xavier Szewai Wong
(74) *Attorney, Agent, or Firm* — Staas & Halsey LLP

(57) ABSTRACT

When characters are allocated to a keyboard, a plurality of consonants are divided into a plurality of groups according to pronunciation position in the oral cavity, and the groups are allocated to corresponding columns on the keyboard of 3 rows and 10 columns. A plurality of vowels are allocated to the corresponding columns according to the pronunciation position in the oral cavity. In this instance, the consonants and the vowels of which the pronunciation position are near the lips are allocated to the middle area of the area of 3 rows and 10 columns, and the consonants and the vowels of which the pronunciation position are near the vocal chords are allocated to the outer part of the area of 3 rows and 10 columns. The consonants and the vowels are allocated to the corresponding rows of the area of 3 rows and 10 columns according to usage frequency.

12 Claims, 14 Drawing Sheets

U.S. PATENT DOCUMENTS

| | | | |
|---|---|---|---|
| 2007/0189197 A1* | 8/2007 | Kwon et al. | 370/319 |
| 2008/0019327 A1* | 1/2008 | Kwon et al. | 370/336 |

FOREIGN PATENT DOCUMENTS

| | | |
|---|---|---|
| KR | 10-2006-0078667 | 7/2006 |
| KR | 10-2007-0036004 | 4/2007 |
| KR | 10-2007-0075839 | 7/2007 |
| KR | 10-2007-0103649 | 10/2007 |
| WO | 2006/039812 | 4/2006 |
| WO | 2007/120022 | 10/2007 |

* cited by examiner

RESOURCE ALLOCATION METHOD, MAP CONFIGURATION METHOD, AND RESOURCE ALLOCATION INFORMATION TRANSMISSION METHOD IN MOBILE COMMUNICATION SYSTEM

CROSS REFERENCE TO RELATED APPLICATIONS

This application claims the benefit under 35 U.S.C. Section 371, of PCT International Application No. PCT/KR2008/001402, filed Mar. 12, 2008, which claimed priority to Korean Application No. 10-2007-0057836, filed Jun. 13, 2007, the entire disclosures of which are incorporated by reference as a part of this application.

TECHNICAL FIELD

The present invention relates to a resource allocation method, a MAP configuration method, and a resource allocation information transmission method in a mobile communication system.

This work was supported by the IT R&D program of MIC/IITA [2007-P10-03, Development of WiBro Evolution Standards].

BACKGROUND ART

A conventional mobile communication system such as the IEEE 802.16 notifies a mobile station of an allocated radio resource or transmitting control information for radio link control by using a MAP that is transmitted through a downlink for each frame. The conventional signaling method includes a radio resource allocated for transmitting a corresponding packet and control information in the MAP for each frame so as to transmit the packet of a corresponding service in the case of a voice over IP (VoIP) service that requires a periodic and fixed bandwidth for a predetermined time, thereby generating undesired overhead of the MAP.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a resource allocation method for reducing a MAP overhead, a MAP configuration method, and a resource allocation information transmission method to a service that requires a fixed bandwidth for a predetermined time.

Technical Solution

In one aspect of the present invention, a method for a base station to allocate a resource in a mobile communication system includes: setting a radio resource region for resource allocation; allocating slots that are not allocated in a first direction starting from the first slot from among a plurality of slots included in the radio resource region regarding a service that requires a dynamic resource for each frame; and allocating other slots that are not allocated in a second direction starting from the second slot from among the slots when the radio resource is reallocated or canceled for the service that requires a fixed band for a predetermined time, the second direction being opposite the first direction.

In another aspect of the present invention, a method for a base station to configure a MAP in a mobile communication system includes: including information for indicating whether a resource allocation type for a plurality of slots included in the radio resource region is dynamic allocation or fixed allocation in the MAP; including dynamic allocation information for indicating information on the slots that are allocated in the first direction starting from the first slot from among the plurality of slots in the MAP when the resource allocation type is the dynamic allocation; and including the fixed allocation information for indicating information on the slots that are allocated in a second direction starting from the second slot from among the plurality of slots in the MAP when the resource allocation type is fixed, the second direction being opposite the first direction.

In another aspect of the present invention, a method for a base station to transmit resource allocation information to a mobile station in a mobile communication system includes: transmitting information on a radio resource region of a plurality of slots used for resource allocation to the mobile station; fixedly allocating slots that are not reversely allocated starting from a slot that is provided last when the slots are arranged in a first dimension regarding at least one sub-burst that requires a fixed band for a predetermined time within the radio resource region; transmitting a connection identifier of the at least one sub-burst to the mobile station; and transmitting information on the slots that are allocated to the at least one sub-burst to the mobile station.

In another aspect of the present invention, a MAP signaling method by a base station in a mobile communication system includes: transmitting the MAP including fixed allocation information to a mobile station when a service of requiring fixed allocation is generated or a fixedly allocated resource is canceled; and retransmitting the MAP when failing to receive response information caused by transmission of the MAP from the mobile station for a predetermined response time.

Advantageous Effects

According to the exemplary embodiment of the present invention, the MAP configuring method for configuring allocation information on the fixedly allocated radio resource and including the same in the MAP, separated from the dynamically allocated radio resource, reduces the undesired overhead of the MAP by allowing the fixed allocation information to be broadcast once when the fixed allocation is changed.

Also, the mobile station transmits response information to the base station so as to recognize whether the mobile station has received the fixed allocation information when receiving fixed allocation information, and retransmits the corresponding fixed allocation information thereto to thus prevent the fixed allocation information from failing to be transmitted to the mobile station when not receiving fixed allocation information.

BEST MODE FOR CARRYING OUT THE INVENTION

Figure 1:
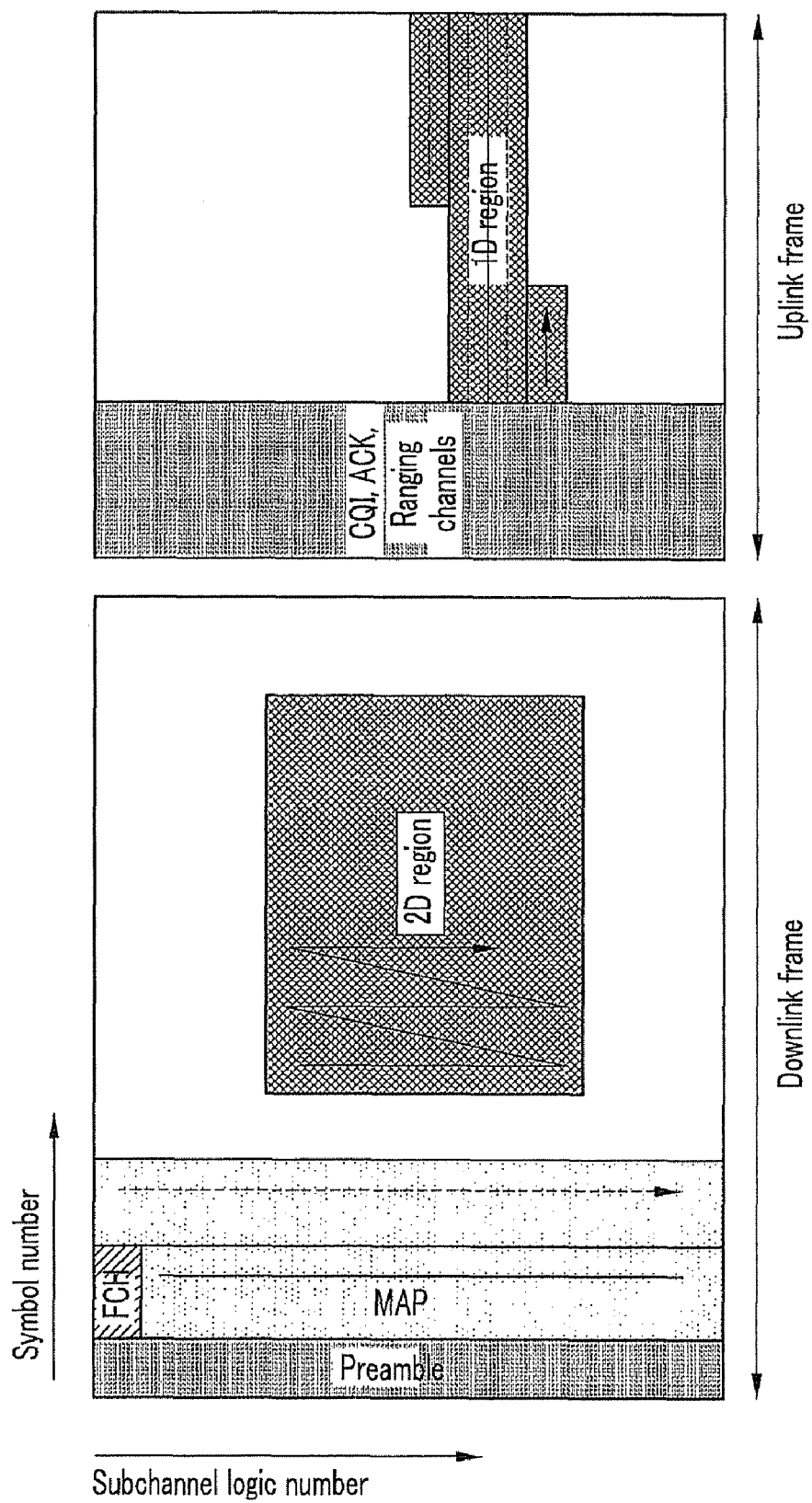
FIG. 1 shows a downlink frame and an uplink frame including a MAP in a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word comprising and variations such as comprises will be understood to imply the inclusion of stated elements but not the exclusion of any other elements.

A MAP configuring method in a mobile communication system according to an exemplary embodiment of the present invention will now be described with reference to accompanying drawings.

In an exemplary embodiment of the present invention, dynamic allocation represents a method for allocating a radio resource to a dynamic resource requiring service for each frame, and fixed allocation represents a method for controlling a service that requires a fixed bandwidth for a predetermined time to fixedly use a radio resource that is allocated through one radio resource allocation. That is, in the case of fixed allocation, the allocated slot and the transmission method are fixedly used until reallocation or allocation cancelling is performed. Also, the radio resource that is allocated through fixed allocation will be referred to as a fixed resource, and the radio resource that is allocated through dynamic allocation will be called a dynamic resource.

FIG. 1 shows a downlink frame and an uplink frame including a MAP in a mobile communication system according to an exemplary embodiment of the present invention.

In FIG. 1, the horizontal axis is the time axis with reference to a symbol, and the vertical axis is the frequency axis with reference to a subchannel. The subchannel represents a group of a plurality of subcarriers.

Referring to FIG. 1, the first symbol in the downlink frame is used for a preamble. A radio resource after the preamble is allocated per slot, and a frame control header (FCH) is transmitted through the first four slots after the preamble. The FCH is used to transmit a transmission method of the MAP that is provided to the next FCH slot and a slot duration occupied by the MAP. Here, the slot is the minimum radio resource unit for dividing the radio resource used for downlink data and uplink data transmission, and the slot includes one or a plurality of subchannels on the frequency axis and one or a plurality of symbols on the time axis.

The MAP is used for the base station to transmit radio resource information that is allocated for each sub-burst corresponding to each mobile station or service, and includes a downlink MAP (DL-MAP) including resource allocation information of a downlink frame and an uplink MAP (UL-MAP) including resource allocation information of an uplink frame. The MAP also includes an Information Element (IE) for a radio link control in the downlink and uplink frames.

The MAP displays the region of the radio resource used for data burst transmission as a rectangular second region in the case of downlink, displays region of the radio resource used for data burst transmission as a rectangular first region in the case of uplink, and includes allocation information for each sub-burst of the slots in the corresponding region. In this instance, the slots are allocated to the sub-bursts according to the 1-dimensional method in the ARQ HA designated region of the downlink and the uplink. That is, the slots for the sub-bursts are allocated according to the 1-dimensional method for allocating the slots in the subchannel direction within the designated 2-dimensional region in the case of downlink, and the slots for the sub-bursts are allocated according to the 1-dimensional method for allocating the slots in the symbol direction within the designated 1-dimensional region in the case of uplink.

In the case of an uplink frame, first three symbols are used for a ranging channel, an acknowledge (ACK) channel, and a channel quality indicator (CQI) channel, and sub-bursts for uplink data transmission are allocated after the channels.

Figure 2:
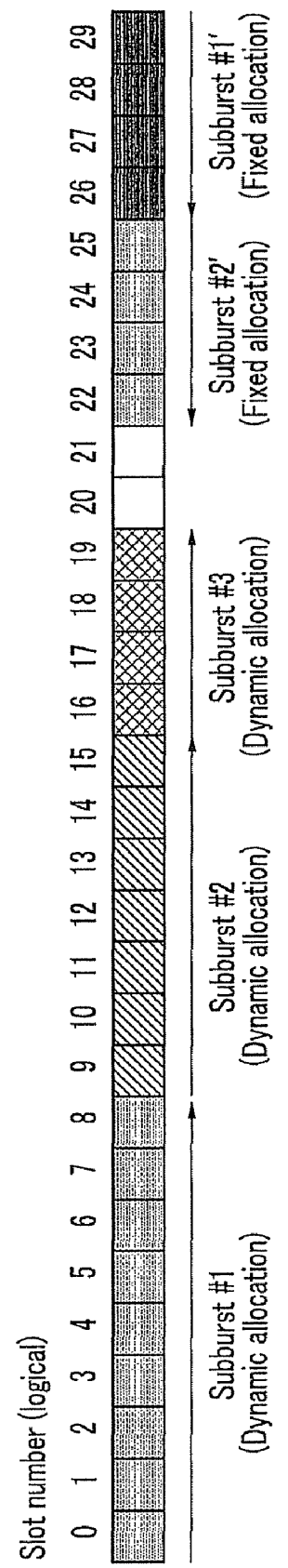
FIG. 2 shows a case for a base station to allocate a radio resource for each sub-burst in a mobile communication system according to an exemplary embodiment of the present invention.

FIG. 2 shows a case for a base station to allocate a radio resource for each sub-burst in a mobile communication system according to an exemplary embodiment of the present invention.

In the exemplary embodiment of the present invention, in the case of dynamic allocation, the base station reports the positions of the slots for the respective sub-bursts starting from the start slot of the corresponding region according to the number of slots in the radio resource region designated by the MAP. The start slot represents a slot that is initially allocated in the region that is designated by the above-noted 1-dimensional method, and the last slot represents a slot that is allocated last.

That is, when the radio resource region is included in the downlink frame, the slots that are included in the symbol that is temporally provided first in the 2-dimensional radio resource region are arranged in the subchannel direction as shown in FIG. 1. The slots of the second symbol are arranged in the subchannel direction next to the last slot of the first symbol, and the slots of the third symbol are arranged in the subchannel direction next to the last slot of the second symbol, and hence, the slots are arranged in the 1-dimensional manner. In this case, the start slot is the start slot of the first symbol, and the slot that is provided last in the subchannel direction from among the slots of the symbol that is temporally provided last is the last slot.

When the radio resource region is included in the uplink frame, the slots that are provided first in the subchannel direction from among the slots included in the radio resource region are temporally arranged, the slots that are provided second in the subchannel direction are temporally arranged, and the slots that are provided third in the subchannel direction are temporally arranged, thereby arranging the slots of the radio resource region as shown in FIG. 1. In this case, the slot that is provided first is the start slot and the slot that is provided last is the last slot.

The slots used for all sub-bursts must be continuous so as to transmit the position of the slot that corresponds to each sub-burst by using the number of slots (or slot duration). Therefore, when the resource is allocated in the same radio resource region as the dynamic allocation in the case of fixed allocation, the slots are allocated in the reverse direction from the last slot of the designated radio resource region so that the slots may not be superimposed on the slots that are used by dynamic allocation. Here, the last slot represents the slot that is allocated last in the region designated by the 1-dimensional method as described above.

Referring to FIG. 2, the base station uses the slots beginning from the start slot of the designated radio resource region for dynamic allocation, and uses the slots beginning from the end slot of the designated radio resource region for fixed allocation. When the case for allocating the radio resource of the designated region including 30 slots for each sub-burst is exemplified, the slots beginning from the slot 0 of the designated region are sequentially allocated so as to perform dynamic allocation on the sub-burst #1, sub-burst #2, and sub-burst #3, and the slots beginning from the slot 29 that is the last slot of the designated region so as to perform fixed allocation on the sub-burst #1' and sub-burst #2'.

Figure 3:
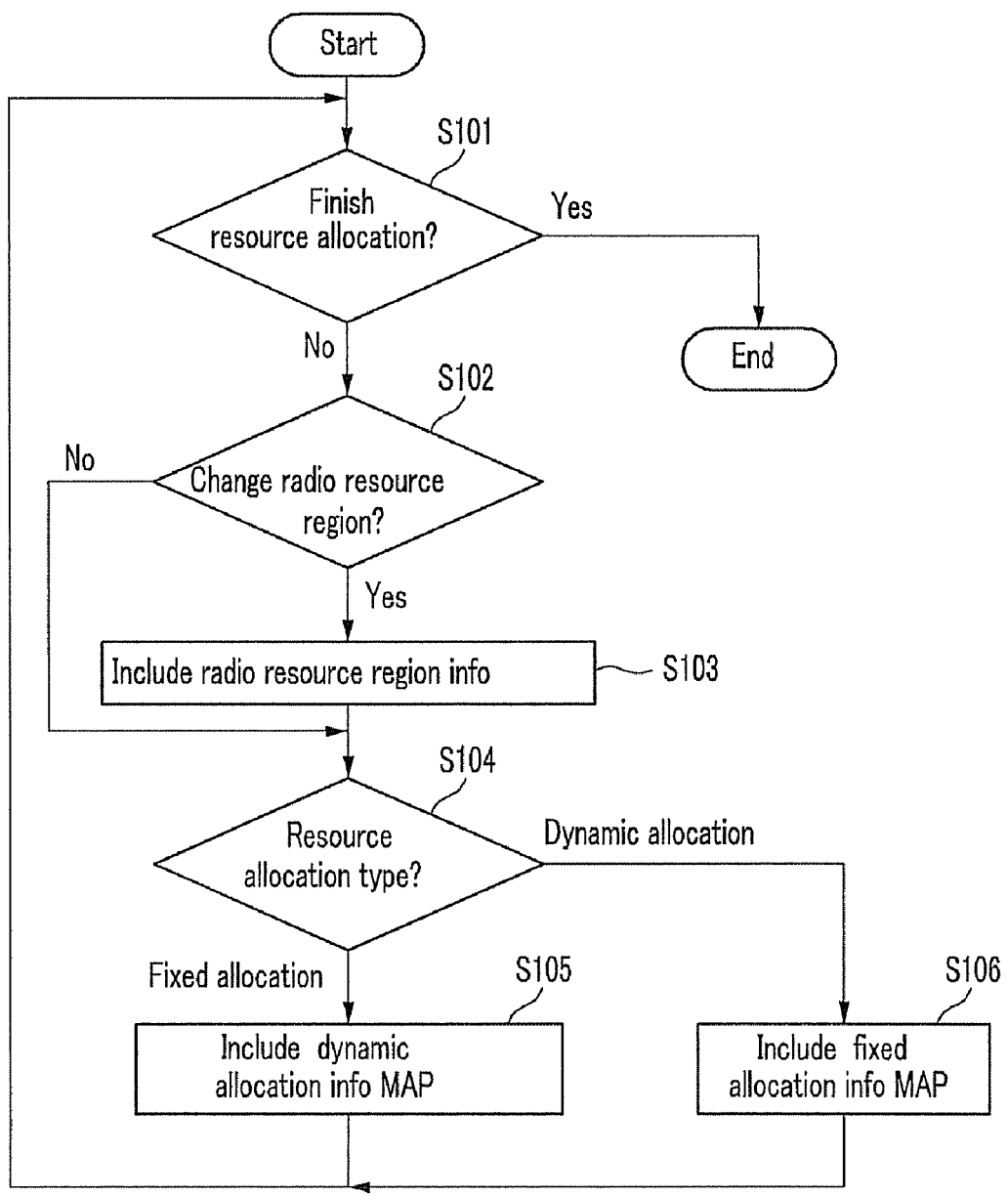
FIG. 3 shows a flowchart for a MAP configuration method in a mobile communication system according to an exemplary embodiment of the present invention.
Figure 4:
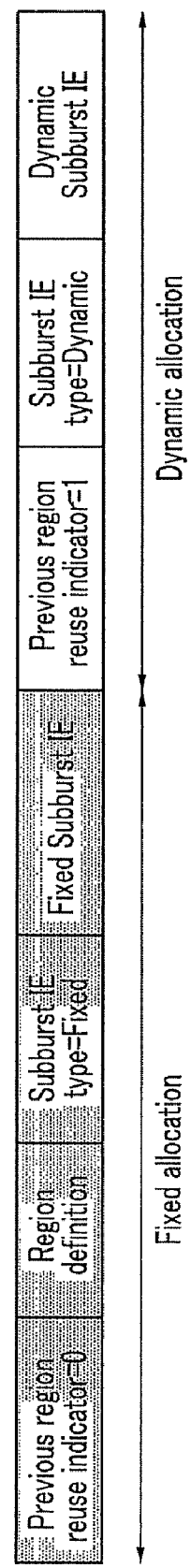
FIG. 4 shows a MAP configuration case for including a dynamic allocation and fixed allocation information when dynamic allocation and fixed allocation are performed in the same radio resource region according to an exemplary embodiment of the present invention.
Figure 5:
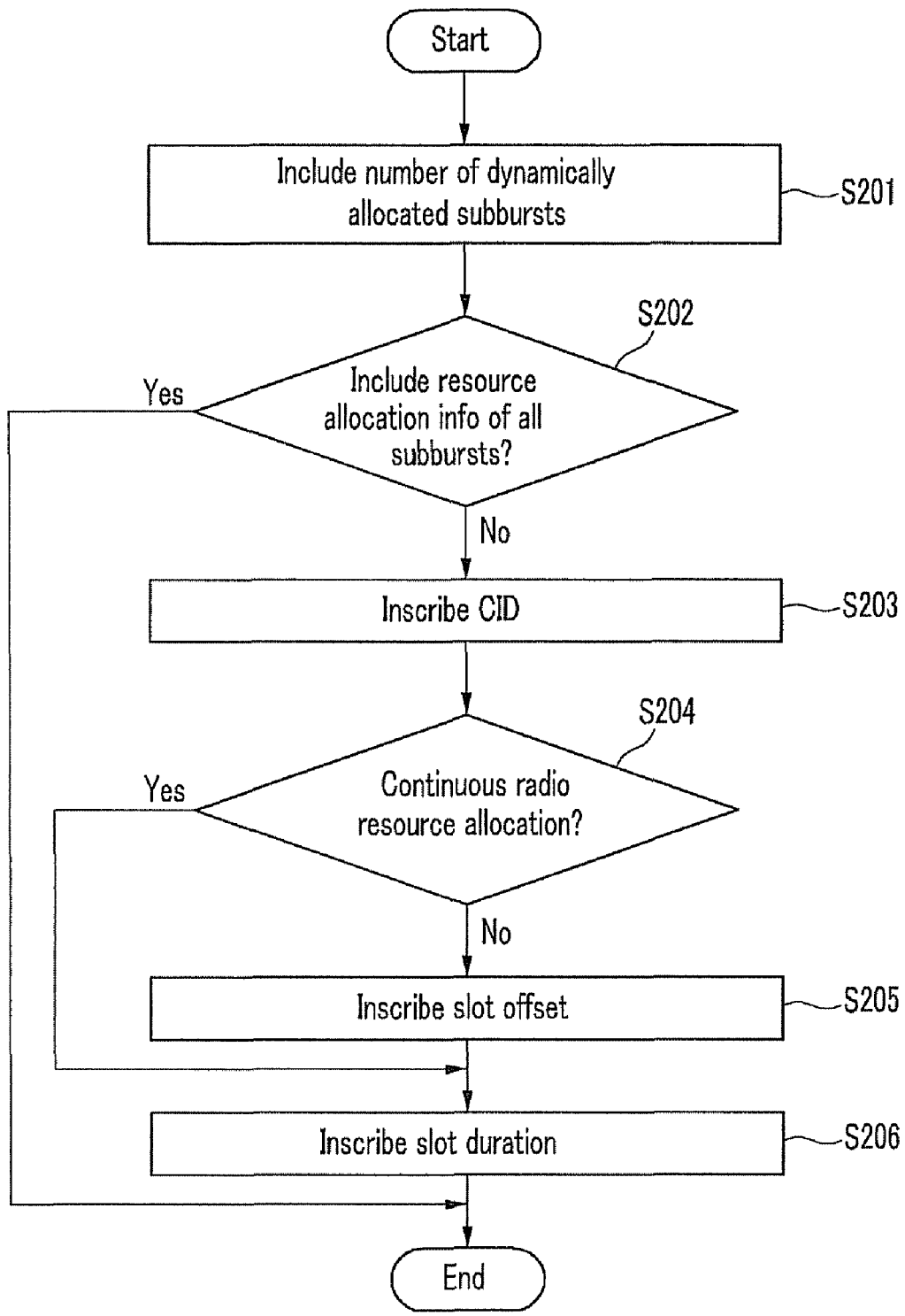
FIG. 5 shows a flowchart for including a MAP in fixed allocation information according to an exemplary embodiment of the present invention.

Referring to FIG. 3 to FIG. 5, a method for configuring a MAP in a mobile communication system according to an exemplary embodiment of the present invention will now be described.

The subsequent MAP configuration method is applicable to the downlink MAP and the uplink MAP.

FIG. 3 shows a flowchart for a MAP configuration method in a mobile communication system according to an exemplary embodiment of the present invention, and exemplifies a case including resource allocation information on a designated radio resource region in a MAP.

Since either or both of the fixed allocation and the dynamic allocation can be performed within one designated radio resource region, at least one resource allocation information can be included in the MAP in one designated region.

Therefore, as shown in FIG. 3, the base station repeatedly includes next resource allocation information in the MAP until including resource allocation information on all the radio resources that are allocated in the designated radio resource region in the MAP S101.

As at least one of resource allocation information is included in the MAP in the same radio resource region as described above, the base station determines whether the resource allocation information to be included in the current MAP is allocation information on the radio resource region that is the same as the resource allocation information previously included in the MAP S102, and it includes corresponding information in the MAP, so as to prevent the information on the same radio resource region from being repeatedly included in the MAP. Also, when the radio resource region corresponding to the current resource allocation information is not the same as the radio resource region corresponding to the resource allocation information included in the previous MAP, the base station includes new radio resource region information in the MAP S103.

The base station determines whether the resource allocation type is dynamic allocation or fixed allocation S104, includes dynamic allocation information in the MAP S105 when the resource allocation type is dynamic allocation, and includes fixed allocation information in the MAP S106 when the resource allocation type is fixed allocation.

Since at least one piece of resource allocation information can be included in the MAP for one designated radio resource region as described above, the base station repeatedly performs the above-described steps S102-S106 until including all resource allocation information on the designated radio resource region in the MAP.

Table 1 shows a MAP IE (information element) including resource allocation information according to an exemplary embodiment of the present invention, showing the MAP IE that includes the fields that are generated in the steps S101-S106. One MAP IE may include resource allocation information of at least one designated radio resource region.

TABLE 1

| Syntax | Notes |
| --- | --- |
| HARQ MAP IE { | |
|   Type | IE type |
|   IE length | Total length of IE |
|   While (data remained) { | |
|     Previous region reuse indicator | 0: New region, 1: Reuse the previous region |
|     If (Previous region reuse indicator == 0) { | |
|       Region Definition | 2D region for DL, 1D region for UL |
|     } | |
|     Subburst IE type | Dynamic or Fixed |
|     Subburst IE length | Length of subburst IE |
|     if (SubburstIE type == Dynamic ) { | |
|       Dynamic subburst IE | |
|     } else { | |
|       Fixed subburst IE | |
|     } | |
|   } | |
| } | |

Referring to Table 1, the MAP IE includes a type field and an IE length field. The MAP IE further includes a previous region reuse indicator field, a sub-burst IE type field, and a sub-burst IE length field.

The previous region reuse indicator field is used to provide information of whether the radio resource region corresponding to the current resource allocation information is a newly defined region or a previously used radio resource region in the previous step of S102. For example, when the previous region usage indicator field is 0, it indicates that the radio resource region is not changed, and when the previous region usage indicator field is 1, that is, when the radio resource region is newly defined, the MAP IE further includes a region definition field. The region definition field defines the radio resource region as a 2-dimensional rectangle region in the case of a downlink, and defines the radio resource region as a 1-dimensional region in the case of an uplink.

The sub-burst information element type field is used to transmit information on the resource allocation type to the mobile station. The MAP IE further includes a dynamic sub-burst IE when the corresponding resource allocation information corresponds to dynamic allocation, and further includes a fixed sub-burst IE when the corresponding resource allocation information corresponds to fixed allocation. The mobile station determines whether the resource allocation information is dynamic allocation information or fixed allocation information with reference to the sub-burst information element type field.

The MAP IE may include at least one radio resource region information as described above, and may include at least one resource sub-burst IE including resource allocation information for one radio resource region.

FIG. 4 shows an exemplified MAP configured through the steps of S101 to S106, showing the case in which there is dynamic and fixed allocation information for one radio resource region.

Referring to FIG. 4, the base station set the previous region indicator as 0 (previous region reuse indicator=0) to define a new radio resource region. The base station sets the sub-burst IE type field as fixed allocation (sub-burst IE type=Fixed), and positions the corresponding fixed sub-burst IE (fixed sub-burst).

After positioning the fixed sub-burst IE, the base station sets the region indicator as 1 (previous region reuse indicator=1) and notifies the mobile station of the fact that the dynamic allocation is performed by using the radio resource region that is previously defined for fixed allocation so as to perform dynamic allocation by using the same radio resource region. Also, the base station sets the sub-burst IE type field as dynamic allocation (sub-burst IE type=Dynamic) to indicate that the corresponding resource allocation information corresponds to dynamic allocation, and positions the corresponding dynamic sub-burst IE.

Figure 6:
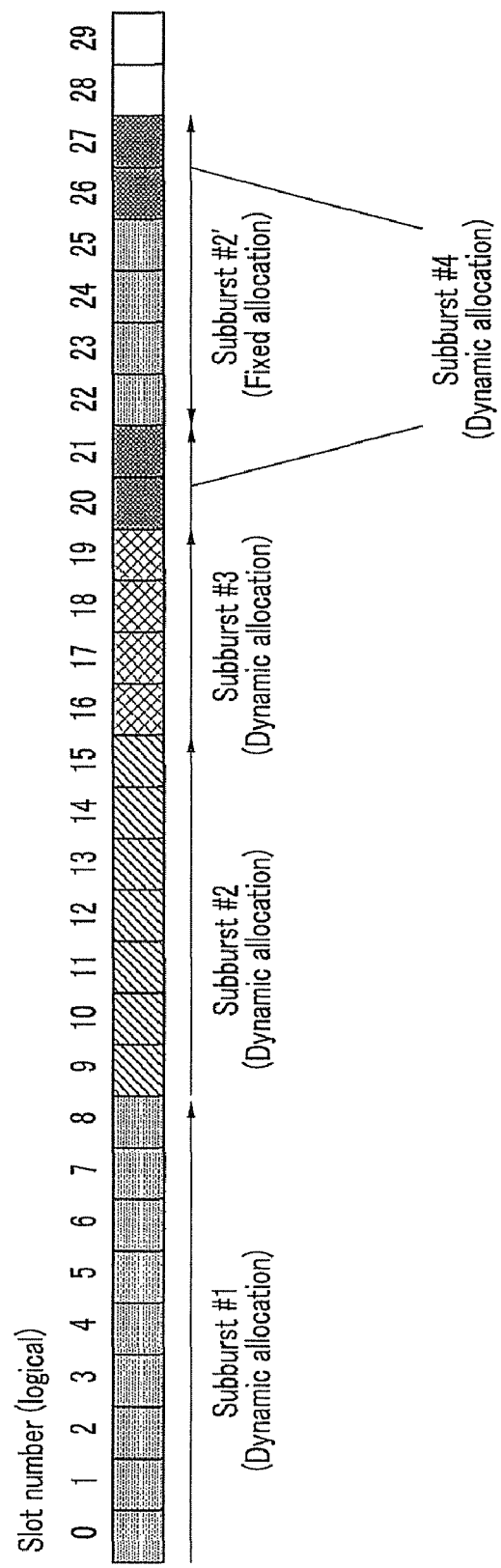
FIG. 6 shows a radio resource allocation case when dynamic allocation and fixed allocation are performed in the same radio resource region according to an exemplary embodiment of the present invention.

Referring to FIG. 5 and FIG. 6, a method for including dynamic allocation information according to an exemplary embodiment of the present invention into the MAP will be described.

FIG. 5 shows a flowchart for including dynamic allocation information according to an exemplary embodiment of the present invention into the MAP. Also, FIG. 6 shows a case of radio resource allocation when dynamic allocation and fixed allocation according to an exemplary embodiment of the present invention are performed in the same radio resource region, exemplifying the case in which the radio resource that is dynamically allocated for a sub-burst by a fixedly allocated radio resource.

Referring to FIG. 5, the base station includes the number of mobile stations or services to which the radio resource is dynamically allocated in the MAP so as to configure the dynamic allocation information S201.

The base station includes resource allocation information on the sub-burst that is dynamically allocated for each mobile station or service into the MAP until resource allocation information of all dynamically allocated sub-bursts is included in the MAP S202.

For this, the base station includes a connection identifier (CID) of the corresponding mobile station or service in the MAP S203 so as to notify the mobile station of the fact to which mobile station or service each sub-burst belongs.

The base station checks whether the radio resource allocated to the corresponding sub-burst is continuously allocated S204. Here, the fact that the radio resource is continuously allocated represents that the radio resource is continuously allocated in connection with the previously allocated sub-burst, and the slots included in the corresponding radio resource are continuous. The fact that the radio resource is not continuously allocated includes the radio resources that are separated by the fixedly allocated radio resource, or represents that the radio resource is not allocated in connection with the previously allocated sub-burst.

When the corresponding subburst includes a discontinuous radio resource, the base station includes the start time of the discontinuous slot in the MAP S205, and includes the slot duration (the number of slots) continuously allocated from the slot offset in the MAP S206. Also, when the corresponding sub-burst includes a continuous radio resource and a discontinuous radio resource, the base station expresses allocation information with the slot duration in the case of the continuous radio resource S206, and includes resource allocation information configured by the slot offset and the slot duration in the MAP in the case of the discontinuous radio resource S205 and S206. Therefore, for one sub-burst, at least one resource allocation information can be included in the MAP.

When the radio resource of the sub-burst is continuously allocated, the slot duration of the allocated radio resource is included in the MAP S206.

Referring to FIG. 6, for example, the radio resource allocated to the sub-burst #4 is not continuous since it is divided by the fixed resource that is fixedly allocated to the sub-burst #2'. Therefore, the base station includes the slot durations of the two slots that are allocated to the former part of the slots allocated to the sub-burst #4 into the MAP in a like manner of other sub-bursts that are configured by continuous slots, and the base station includes the slot offset and the slot duration of the two slots that are divided by the fixed resource and are allocated to the latter part into the MAP. In this case, the base station includes the slot offset and the slot duration of the divided radio resource in the MAP so that the mobile station having received the slot offset and the slot duration may use the radio resource without the fixed allocation slot.

Referring to FIG. 5, the base station repeats the steps of S203 to S206 until allocation information on all dynamically allocated sub-bursts is included in the MAP S202.

When the dynamic allocation is expressed according to the above-noted method, the undesired MAP overhead can be reduce since the slot offset is included in the MAP in the case of discontinuous radio resource without including the slot offsets of all subburst in the MAP.

Table 2 shows a method for configuring dynamic allocation information according to an exemplary embodiment of the present invention, indicating dynamic allocation information including the fields generated in the steps S201 to S206.

TABLE 2

| Syntax | Notes |
|---|---|
| Fixed-subburst IE { | |
|   N_subburst | Number of subbursts allocated |
|   For (j=0; j<N _subburst; j++) { | |
|     CID | |
|     Period | Periodicity of fixed allocation |
|     Transmission method | |
|   } | |

TABLE 2-continued

| Syntax | Notes |
| --- | --- |
| Slot offset indicator | 0: No slot offset, 1: Use the slot offset |
| If (Slot offset indicator==1) { | |
| Slot offset | Starting slot index for allocated slots |
| } | |
| Slot duration | Total number of slots in the toggle pattern |
| All slots indicator | 1: All slots are used for one CID |
| If (All slots indicator == 0) { | |
| Toggle unit size | 0: 1-bittoggle, 1: 2-bit toggle |
| Compressed Toggle Pattern | Toggle bit pattern for slot allocation |
| } | |
| } | |

Referring to Table 2, dynamic allocation information corresponding to the dynamic sub-burst IE includes the total number of dynamically allocated sub-bursts (N_sub-burst).

Also, the dynamic allocation information includes a connection identifier (CID) corresponding to each sub-burst, a slot offset indicator, a slot duration for indicating the length of a radio resource occupied by the sub-burst, and continuity a continuity indicator. The connection identifier notifies the mobile station to which service or mobile station the resource allocation information provided after the corresponding connection identifier corresponds.

The slot offset indicator notifies whether the next allocation information is for a continuous radio resource, and when the slot indicator is 1, that is, when the next allocation information is not a continuous radio resource, the dynamic allocation information further includes a slot offset for notifying the start position of the corresponding radio resource.

Referring to FIG. 6, the slot offset indicator is set as 0 to include the slot duration in the MAP in the case of two former slots from among all slots that are allocated to the sub-burst #4, and the slot offset indicator is set as 1 to include the slot offset and the slot duration in the MAP in the case of two latter slots.

Also, allocation information can be connected by the mobile station by using a continuity indicator in the case of sub-bursts that are divided into a plurality of parts. That is, referring to FIG. 4, allocation information on the two former slots of the subburst #4 is included in the MAP, a slot offset and a slot duration of the two latter slots is included in the MAP, the continuity indicator is set as 1 to notify connection with previous allocation, and the transmission method is not included in the MAP since the same transmission method is used.

Referring to FIG. 7 to FIG. 13, a method for including fixed allocation information according to an exemplary embodiment of the present invention into the MAP will be described.

Figure 7:
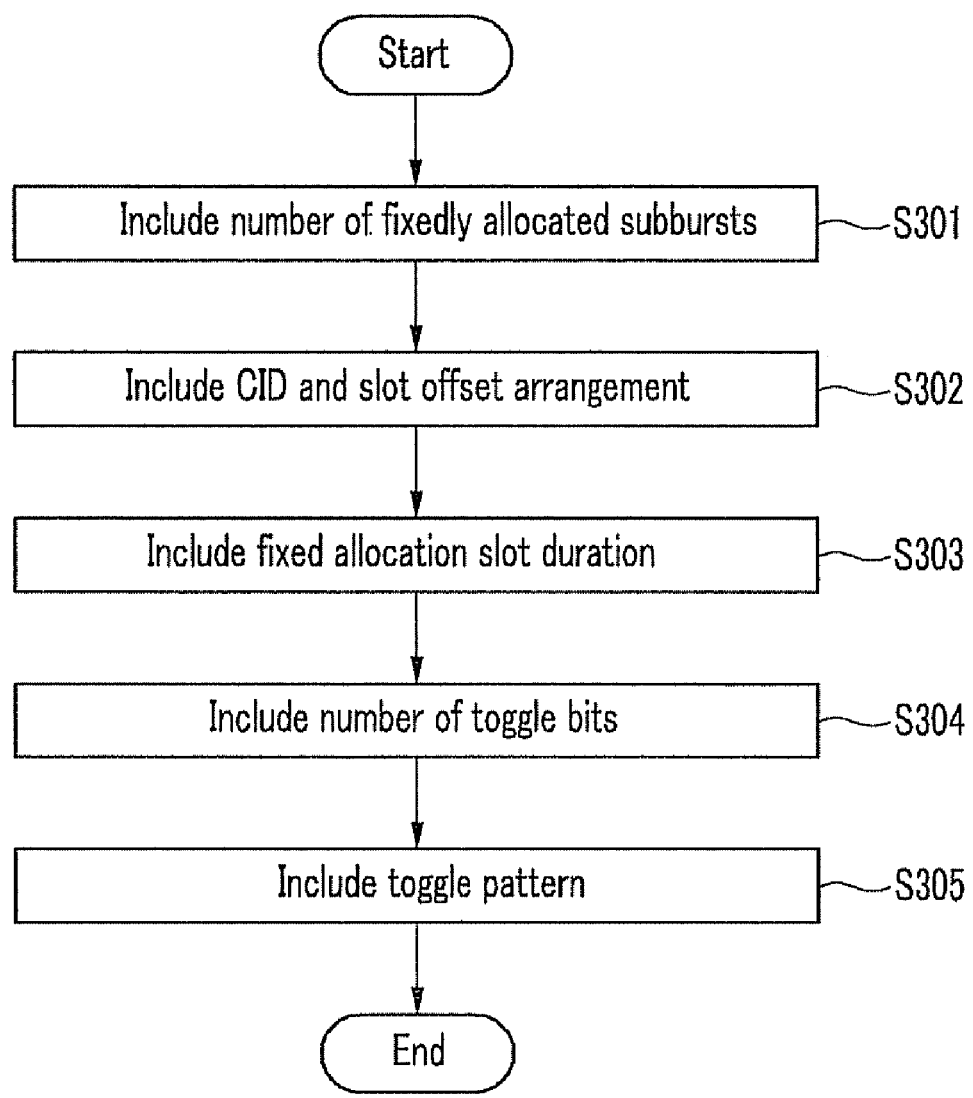
FIG. 7 shows a flowchart for including fixed allocation information in a MAP according to an exemplary embodiment of the present invention.
Figure 8:
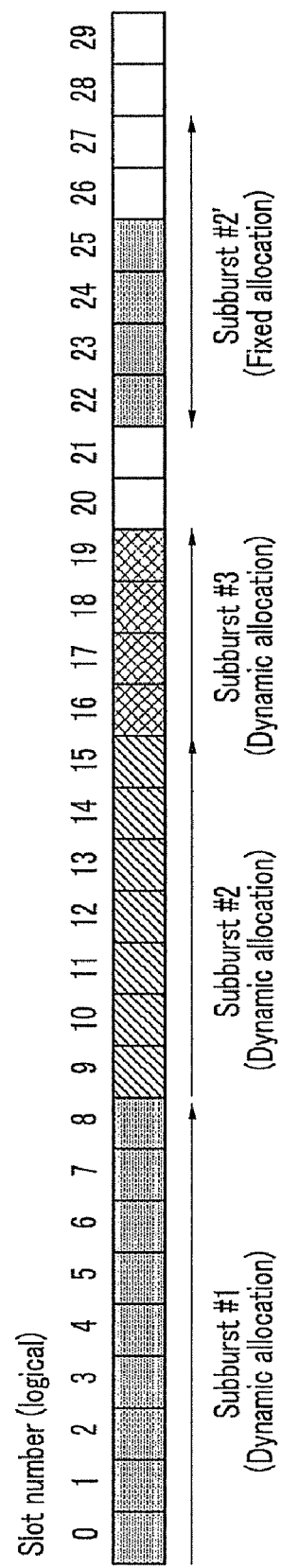
FIG. 8 shows a resource allocation case when fixed allocation according to an exemplary embodiment of the present invention does not start from an end slot of a predetermined radio resource region.

FIG. 7 shows a flowchart for including fixed allocation information in a MAP according to an exemplary embodiment of the present invention. FIG. 8 shows a resource allocation case when fixed allocation according to an exemplary embodiment of the present invention does not start from an end slot of a predetermined radio resource region.

Referring to FIG. 7, the base station includes the number of fixedly allocated sub-bursts in the radio resource region into the MAP sp as to configure fixed allocation information 5301.

The base station includes information having a connection identifier (CID) corresponding to a mobile station or a service, and slot offsets of slots that are used for fixed allocation into the MAP S302. In this instance, the slot offset is omitted as shown in FIG. 2 when the slots are started beginning from the last slot of the radio resource region to which fixed allocation is designated, and the slot offset is included in the MAP as shown in FIG. 8 when the slots are started beginning from other slots that are not the last slot of the radio resource region to which fixed allocation is designated.

When the connection identifier and the slot offset are included in the MAP, the base station includes the entire slot duration used for fixed allocation, that is, the total number of slots in the MAP S303. The base station sets the number of toggle bits used for indicating resource allocation information according to fixed allocation, and includes the same number of toggle bits in the MAP S304.

When the number of toggle bits is set, the base station uses the number to generate a toggle pattern according to fixed allocation and includes the same in the MAP, and the base station can compress the toggle pattern and include it in the MAP S305.

A newly fixedly allocated slot is frequently discontinuous because of reallocation and allocation cancelation of fixedly allocated slots in the previous frame in the case of fixed allocation, and hence, when the number of slots and the slot offset are concurrently notified in a like manner of dynamic allocation, at least one sub-burst allocation may need information on at least one slot offset and the number of slots. Therefore, in the case of fixed allocation, the overhead of the MAP can be reduced by using the toggle bit and expressing the fixed allocation information other than the slot offset and the number of slots.

Figure 9:
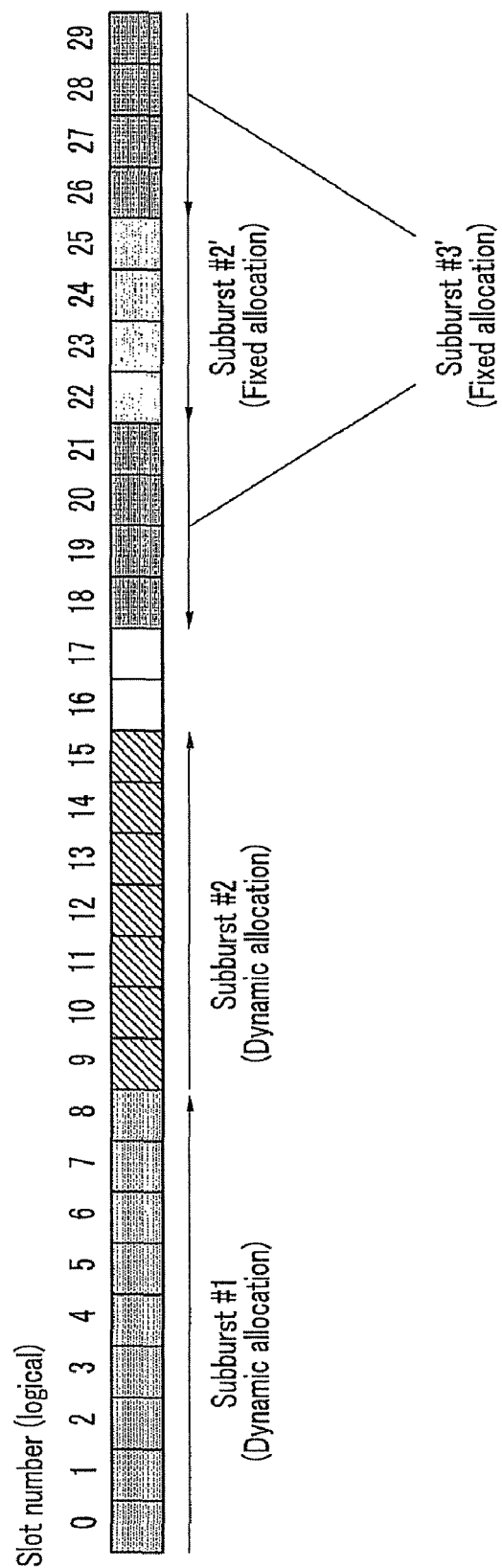
FIG. 9 shows a resource allocation case when a fixedly allocated radio resource is not configured by continuous slots in a sub-burst according to an exemplary embodiment of the present invention.

Table 3 shows fixed allocation information configuration method according to an exemplary embodiment of the present invention, showing the fixed allocation information including fields that are generated in the steps S301-S305. Also, FIG. 9 shows resource allocation according to an exemplary embodiment of the present invention, showing the case in which the fixedly allocated sub-burst #1' and sub-burst #2' are used in the previous frame, and eight slots are allocated to the sub-burst #3' in the current frame when the sub-burst #1' is canceled and the sub-burst #2' remains as shown in FIG. 2.

TABLE 3

| Syntax | Notes |
| --- | --- |
| Fixed-subburst IE { | |
| N_subburst | Number of subbursts allocated |
| For (j=0; j<N _subburst; j++) { | |
| CID | |
| Period | Periodicity of fixed allocation |
| Transmission method | |
| } | |
| Slot offset indicator | 0: No slot offset, 1: Use the slot offset |
| If (Slot offset indicator==1) { | |
| Slot offset | Starting slot index for allocated slots |
| } | |
| Slot duration | Total number of slots in the toggle pattern |
| All slots indicator | 1: All slots are used for one CID |
| If (All slot indicator == 0) { | |
| Toggle unit size | 0: 1-bittoggle, 1: 2-bit toggle |
| Compressed Toggle Pattern | Toggle bit pattern for slot allocation |
| } | |
| } | |

Referring to Table 3, fixed allocation information corresponding to the fixed sub-burst IE includes a connection identifier (CID) of a sub-burst that is fixedly allocated in the radio resource region designated by the MAP, a period field for indicating a fixed allocation period of each sub-burst, and a transmission method field for indicating a transmission method.

Also, the fixed allocation information includes a slot offset indicator, and when the slot offset indicator is 1, that is, when the fixed allocation starts from a slot other than the last slot, the fixed allocation information includes a slot offset for notifying the position of the slot at which fixed allocation begins. Referring to FIG. 8, since fixed allocation does not begin from the last slot, the base station sets the slot offset indicator as 1 and sets the slot offset as 5 to notify the mobile station of the fact that the fixed allocation is reversely performed beginning from the fifth slot of the end of the radio resource region.

Further, as shown in FIG. 9, when the fixed allocation begins from the last slot, the base station sets the slot offset indicator as 0 and includes the same in the fixed allocation information and does not indicate the slot offset in the fixed allocation information. When the slot offset is the slot that is positioned at the end of the designated radio resource region, the mobile station can know that the slot offset of fixed allocation is the last slot through the slot offset indicator without writing the slot offset in the fixed allocation information.

Referring to Table 3, the fixed allocation information further includes the length of the entire slots written by the toggle pattern according to fixed allocation, that is, the slot duration that indicates the number of slots. For example, in FIG. 8, the slot duration is 4 since the number of slots used for fixed allocation is 4.

When a continuous radio resource is fixedly allocated to a mobile station or a service so that one sub-burst is fixedly allocated and the corresponding sub-burst includes continuous slots, the mobile station can detect the position of the corresponding slot by using the slot offset and the slot duration. Therefore, the fixed allocation information includes an all-slots indicator so as to notify the mobile station whether to use the toggle pattern and thereby indicate resource allocation information. When the all-slots indicator indicates 1, that is, when one sub-burst is fixedly allocated, the toggle pattern is omitted from the fixed allocation information. In addition, when the all-slots indicator indicates 0, the fixed allocation information further includes a toggle pattern.

For example, as shown in FIG. 8, when the sub-burst #2' is fixedly allocated, the all-slots indicator is set as 1 in the fixed allocation information, and the toggle pattern is omitted, the mobile station can detect the position of the corresponding sub-burst by using the slot offset and the slot duration. Further, when at least one sub-burst is fixedly allocated or one sub-burst does not include continuous slots, the fixed allocation information further includes a toggle pattern to transmit resource allocation information according to fixed allocation. Referring to FIG. 9 as an example, the toggle pattern is included in the fixed allocation information since there are two fixedly allocated sub-bursts (sub-burst #2', sub-burst #3'), and the sub-burst #3' includes separate slots that are not continuous.

The number of toggle bits that are allocated to a slot can be selected depending on the case, and when the toggle pattern is included in the fixed allocation information, the fixed allocation information further includes a toggle unit size field for indicating the number of toggle bits. The length of the toggle pattern corresponds to the slot duration when a 1-bit toggle is used, and the length of the toggle pattern becomes twice the slot duration when a 2-bit toggle is used. However, when the slots that are allocated to a sub-burst are not continuous or there is a slot that is canceled and is not allocated between the slots that are used for fixed allocation, it is difficult to accurately express the corresponding resource allocation information by using a 1-bit toggle. Therefore, the base station determines the number of toggle bits based on the arrangement of the fixedly allocated slots and the length of the toggle pattern.

The base station includes a compressed toggle pattern in the fixed allocation information so as to reduce the length of the toggle pattern.

Figure 10:
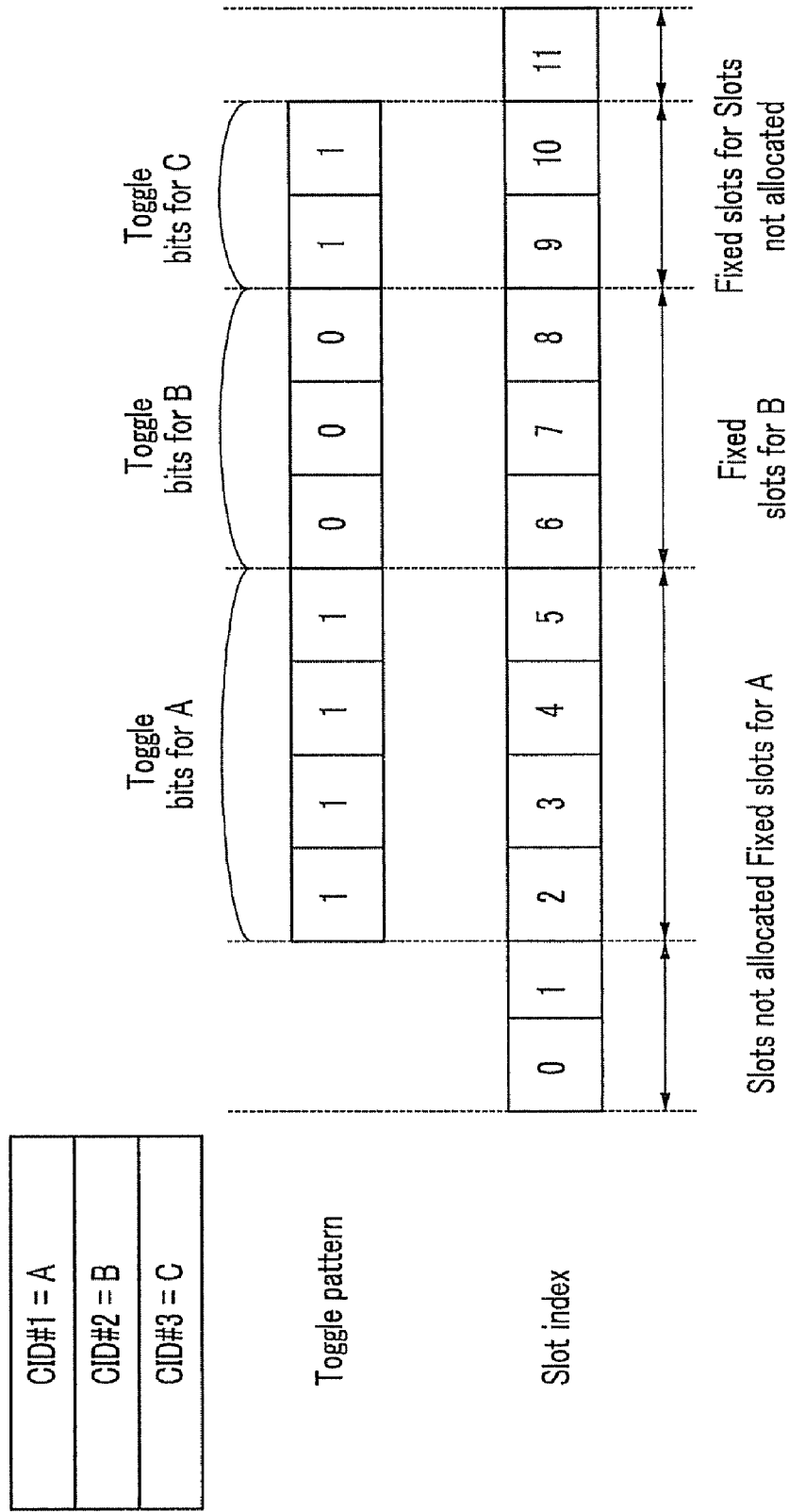
FIG. 10 is a case for configuring a toggle pattern by using a 1-bit toggle according to an exemplary embodiment of the present invention.
Figure 11:
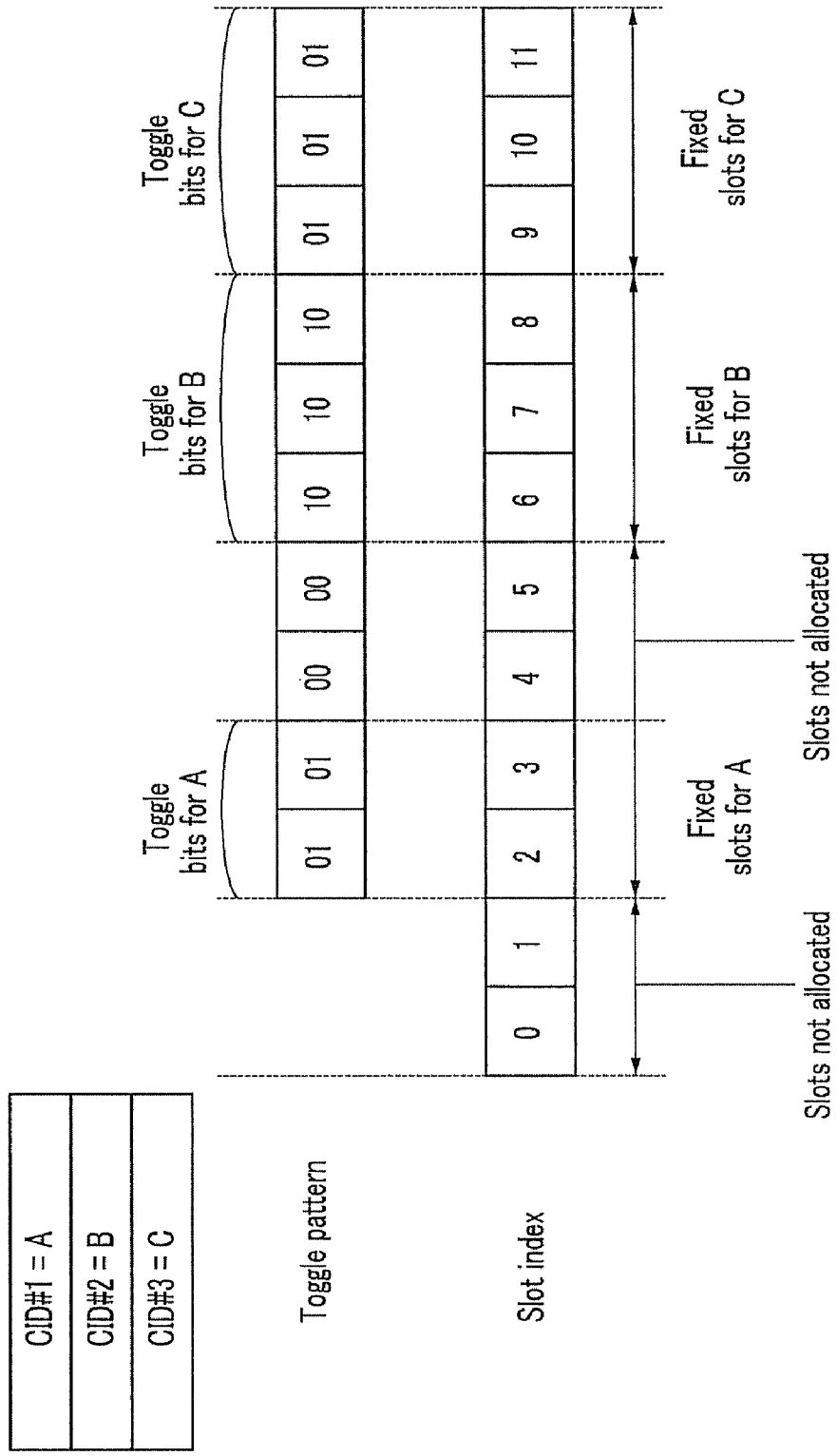
FIG. 11 is a case for configuring a toggle pattern by using a 2-bit toggle according to an exemplary embodiment of the present invention.

FIG. 10 and FIG. 11 show toggle patterns for expressing fixed allocation according to an exemplary embodiment of the present invention, FIG. 10 is a case for configuring a toggle pattern by using a 1-bit toggle, and FIG. 11 is a case for configuring a toggle pattern by using a 2-bit toggle.

Referring to FIG. 10, the base station selects the toggle bit for each CID so that the neighboring CIDs may receive different toggle bits according to the order of including the CIDs of the fixedly allocated sub-burst in the MAP. For example, the toggle bit (Toggle) is set as 1 for the sub-burst A that corresponds to the first CID (CID #1), the toggle bit is set as 0 for the sub-burst B that corresponds to the second CID (CID #2), and the toggle bit is set as 1 for the sub-burst C that corresponds to the third CID (CID #3).

In this instance, since the information on the slot offset and the slot duration of the fixedly allocated radio resource is included in the MAP and the mobile station can thereby know the start and the end of the fixedly allocated slot, the toggle bit is not used so as to express the slots that are provided at the front and the rear of the fixedly allocated slots. Referring to FIG. 10 as an example, since fixed allocation begins from the slot index 2 and a total of 9 slots are used for fixed allocation, no toggle bits for the slot indexes 0, 1, and 11 are allocated. The fixed allocation is and sequentially performed in the reverse direction from the last slot of the designated radio resource region, and the slot index of FIG. 10 is generated by setting the last slot as 0 and increasing the slots in the reverse direction.

The toggle bits corresponding to the respective CIDs are not directly written in the MAP, and it is promised in an implied manner between the base station transmitting the MAP and the mobile station receiving the MAP to allocate the toggle bits according to the order of the CIDs written in the MAP.

When the toggle bits are set for the respective fixedly allocated CIDs, the base station uses the toggle bits to generate a toggle pattern by matching the toggle bit that corresponds to each slot. The length of the generated toggle pattern corresponds to the total number of slots used for fixed allocation since the 1-bit toggle is used.

That is, in FIG. 10, the first consecutive 1's in the toggle pattern indicate the slots allocated to the CID #1, the consecutive 0's after the first consecutive 1's indicate the slots allocated to the CID #2, and the next 1's indicate the slots allocated to the CID #3. The toggle is continued as many times as the number of CID's to be fixedly allocated. In FIG. 10, the length of the toggle pattern is 9 since 9 slots are used for fixed allocation.

FIG. 11 shows a toggle pattern configured by using a 2-bit toggle, in which the base station selects a 2-bit toggle bit for each CID according to the order for including the CID in the MAP. In this instance, the toggle bit is selected so that the neighboring CID's may have different toggle bits. Therefore, 00 is used as the 2-bit toggle bit (Toggle) so as to notify that fixed allocation is not used, and 01 or 10 is sequentially set as the 2-bit toggle bit for each CID according to the order of written CID's in an implied manner.

In FIG. 11, the toggle bit 01 is set for the sub-burst A that corresponds to the first CID (CID #1), the toggle bit 10 is set for the sub-burst B that corresponds to the second CID (CID #2), and the toggle bit 01 is set for the sub-burst B that corresponds to the third CID (CID #3). The toggle bit 11 is not used in the exemplary embodiment of the present invention.

When the fixed allocation information is expressed by using the toggle pattern as described above, it is possible to express the slots by only using the toggle pattern without including an additional start point in the MAP even when continuous slots are not allocated to a mobile station or a service, thereby reducing the overhead of the MAP.

Fixed allocation is broadcast once through the MAP when fixed allocation information is changed, and hence, when the mobile station fails to receive the MAP, the allocated radio resource may be wasted until the base station detects that the mobile station has failed to receive the MAP including the fixed allocation information and reallocates the MAP. Therefore, the mobile station notifies the base station of the response in which the mobile station has successfully received the fixed allocation information through a feedback channel of the uplink or a packet of the MAC layer.

Figure 12:
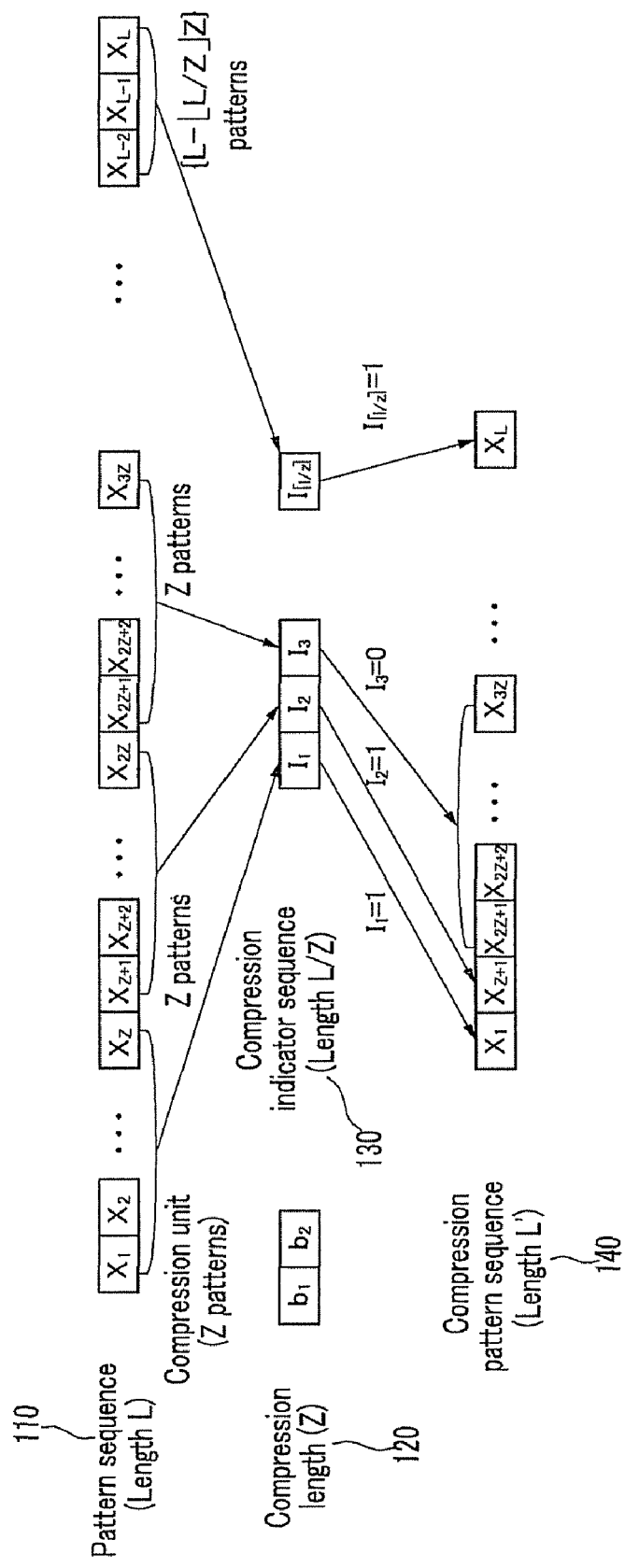
FIG. 12 shows a method for compressing a toggle pattern according to an exemplary embodiment of the present invention.
Figure 13:
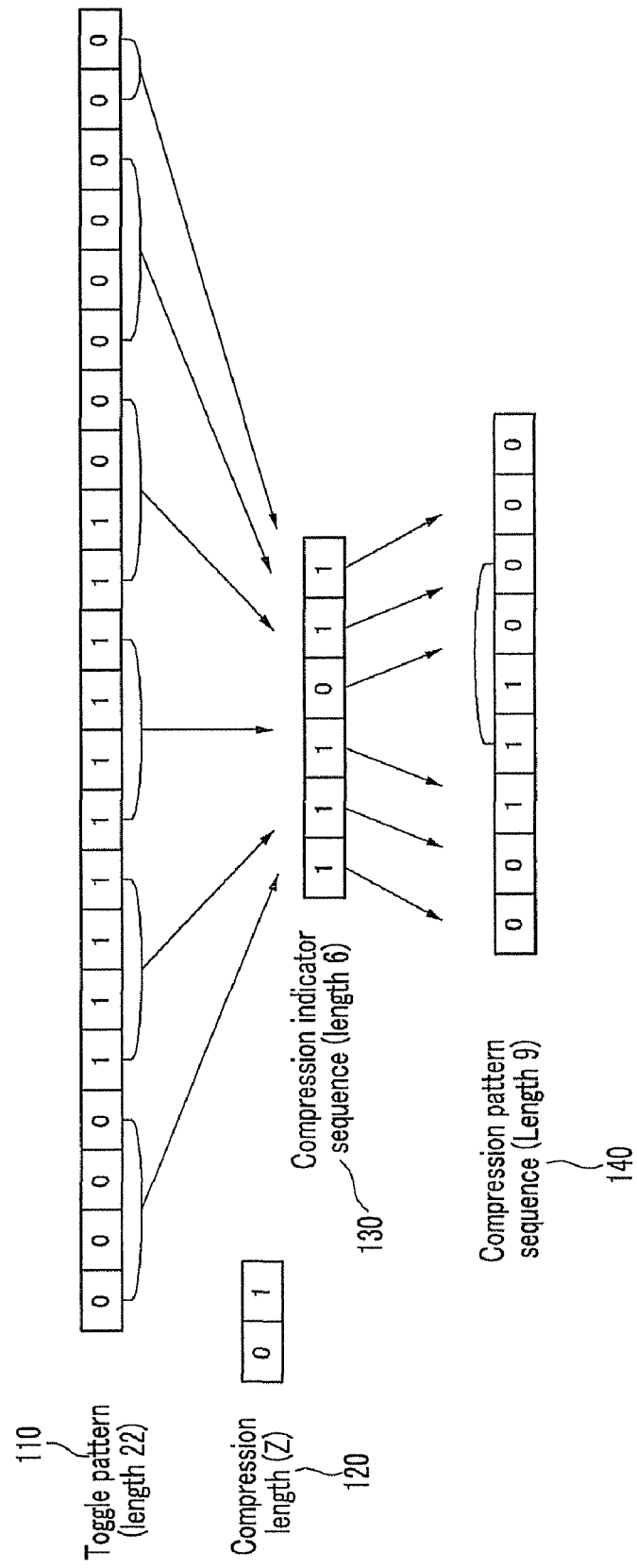
FIG. 13 shows a case for compressing a toggle pattern according to an exemplary embodiment of the present invention.

Referring to FIG. 12 and FIG. 13, a method for compressing a toggle pattern will now be described in detail.

FIG. 12 shows a method for compressing a toggle pattern according to an exemplary embodiment of the present invention, and FIG. 13 shows a toggle pattern that is compressed by using the compression method of FIG. 12.

A method for compressing the toggle pattern by using a compressed pattern sequence method will be described. However, it is also possible to compress the toggle pattern by using another compression method in the embodiment of the present invention.

Referring to FIG. 12, when the bit length for indicating the pattern is P in the pattern sequence having L patterns, the bit length of the entire pattern sequence is L*P.

The compressed pattern sequence method is a method for compressing the uncompressed original pattern sequence into a compression length 120, a compression indicator sequence 130, and a compressed pattern sequence 140, and expressing the three sequences.

The compression length 120 represents the number (Z) of patterns belonging to a group when a plurality of patterns are grouped so as to be compressed. For example, when the compression length 120 is expressed in 2 bits, the compression length of 00 represents no compression, the compression length of 01 indicates 4 patterns (Z=4) as a group, the compression length of 10 shows 6 patterns (Z=6) as a group, and the compression length of 11 represents 8 patterns (Z=8) as a group. When Z patterns are combined into one group in the pattern sequence, the pattern sequence with the length L has L/Z groups. Each group except the last group includes Z patterns, and the last group includes (L-ZL/Z) patterns.

Differing from this, when the compression length 120 is indicated in 1 bit, the compression length value indicates the usage state of the compression pattern. For example, the compression length of 1 (or 0) represents usage of the compression pattern, and the compression length of 0 (or 1) represents no usage of the compression pattern.

The compression indicator sequence 130 has L/Z bits, and the respective bits of the compression indicator sequence 130 indicate the compression state of the corresponding group. For example, when the i-th group is compressed, the i-th bit ($I_i$) of the compression indicator sequence 130 is indicated as 1, and the same is indicated as 0 in another case.

The compressed pattern sequence 140 inscribes the patterns of the group according to the compression indicator sequence 130. When the compression indicator sequence 130 inscribes the i-th group as compressed ($I_i=1$), it means that the i-th group has the same patterns, and it is expressed as one pattern ($X_{Zi-1+1}$) from among the Z patterns ($X_{Zi-1+1}X_{Zi}$) by the compressed pattern sequence 140. When the compression indicator sequence 130 inscribes the j-th group as not compressed ($I_j=0$), it means that the j-th group has different patterns, and the compressed pattern sequence 140 expresses the group as all the Z patterns ($X_{Zj-1+1}X_{Zj}$).

The compressed pattern sequence method compresses the patterns that are repeated in the pattern sequence having continuous repetition patterns, and in the case of the above-noted toggle pattern, the same 1-bit toggle or 2-bit toggle is consecutively included, and it is accordingly possible to compress the pattern by applying the above-noted compressed pattern sequence method. In this instance, the pattern for a compression unit in the case of compressing the toggle pattern is a 1-bit toggle or a 2-bit toggle.

A method for the base station to compress the toggle pattern by using the compressed pattern sequence method will now be described with reference to FIG. 16. In the case of the toggle pattern 110 using a 1-bit toggle, each pattern is expressed by one bit (P=1), and four patterns are designated as a single group since the compression length 120 is 01. When the toggle pattern 110 is divided into 5 groups including 4 patterns, the first, second, third, fifth, and sixth groups repeat the same pattern. Therefore, the compression indicator sequence 130 is configured by 5 bits, the first, second, third, fifth, and sixth bits are indicated by 1 to thus indicate the compressed state, and the residual fourth bit is indicated by 0 to the indicates the non-compressed state. The first group is expressed as a single pattern 0 in the compressed pattern sequence 140 since it has a pattern repeating 0's, and the second and third groups are expressed as a single pattern 1 since they have a pattern of continuous 1's. The fourth group expresses the original pattern since no same pattern is repeated. The fifth and sixth groups are expressed by the pattern 0 so as to indicate the compressed state since they have the pattern of continuous 0's.

Therefore, the 22-bit toggle pattern 110 can be expressed as a 2-bit compression length 120, a 6-bit compression indicator sequence 130, and a 9-bit compressed pattern sequence 140 to thus reduce the pattern sequence of 22−(2+6+9)=5-bit.

A signaling method for a mobile station to transmit a response to a base station after receiving fixed allocation information in the mobile communication system will be described referring to FIG. 14.

Figure 14:
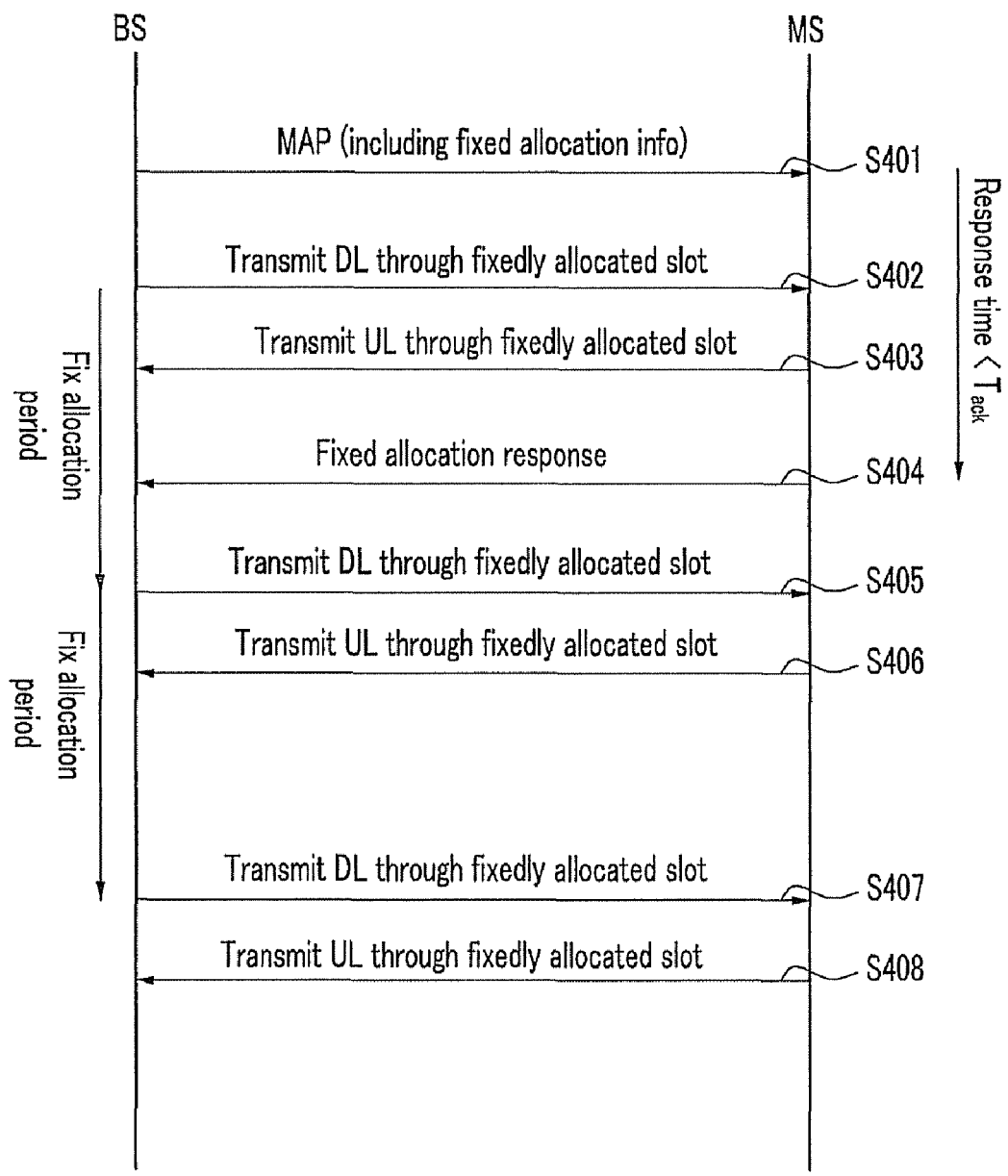
FIG. 14 shows a signaling method in a mobile communication system according to an exemplary embodiment of the present invention.

FIG. 14 shows a signaling method in a mobile communication system according to an exemplary embodiment of the present invention.

Referring to FIG. 14, the base station transmits the fixed allocation information through the MAP S401 when a service for requiring fixed allocation is generated or the fixedly allocated radio resource is canceled, the base station transmits data packets to the mobile station through the allocated slot S402, S405, and S407 in the case of downlink fixed allocation, and the base station receives the data packets from the mobile station through the allocated slot S403, S406, and S408 in the case of uplink fixed allocation. When the fixedly allocated mobile station has no uplink feedback channel, the base station temporarily allocates an uplink feedback channel so as to transmit a response to fixed allocation or allocates part of the uplink slots so as to transmit the response.

When receiving the MAP including the fixed allocation information, the mobile station transmits a predefined codeword ($C_{ack}$) through a feedback channel that is allocated to the mobile station within a specific response time ($T_{ack}$) that is predetermined by a broadcast message or a system parameter S404.

In this instance, the feedback channel that is allocated to the mobile station for reporting channel quality, or the feedback channel that is randomly allocated together with fixed allocation by the base station so as to transmit a response to the fixed allocation, can be used.

The mobile station can include response information in the packet of the MAC layer that is transmitted to the uplink and then transmit them without using a feedback channel. In this case, the mobile station includes response information in a packet and transmits them when there is a packet that is transmitted to the uplink, and transmits a MAC layer packet only including response information when there is no packet that is transmitted to the uplink. Also, the base station can allocate what is used for transmitting the packet to the uplink other than the feedback channel so as to receive a response to the fixed allocation information, and in this case, the mobile station transmits the packet including response information or the packet only including response information through the allocated uplink slot. When there is no allocated uplink slot, the mobile station performs a band request process for request an uplink slot.

When receiving the codeword ($C_{ack}$) from a mobile station to be fixedly allocated through a feedback channel of the corresponding mobile station within a specific response time ($T_{ack}$) or receiving response information through the uplink slot, the base station considers that fixed allocation for the corresponding mobile station is performed. When failing to receive the response to fixed allocation from the corresponding mobile station within the specific response time ($T_{ack}$), the base station considers that the mobile station failed to receive the MAP including the fixed allocation information and retransmits the MAP including the fixed allocation information.

As described, the base station can prevent undesired resource waste by including the fixed allocation information that is configured by using the toggle pattern in the MAP once and transmitting the same at the time when the information is changed, regarding the fixedly allocated radio resource. Also, the mobile station transmits response information to the base station so as to recognize whether the mobile station has received the fixed allocation information when receiving fixed allocation information, and retransmits the corresponding fixed allocation information thereto to thus prevent the fixed allocation information from failing to be transmitted to the mobile station when not receiving fixed allocation information.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a base station to configure a MAP in a mobile communication system, the method comprising:
    including information for indicating whether a resource allocation type for a plurality of slots included in the radio resource region is dynamic allocation or fixed allocation in the MAP;
    including dynamic allocation information for indicating information on the slots that are allocated in the first direction starting from the first slot from among the plurality of slots in the MAP when the resource allocation type is the dynamic allocation; and
    including the fixed allocation information for indicating information on the slots that are allocated in a second direction starting from the second slot from among the plurality of slots in the MAP when the resource allocation type is fixed, the second direction being opposite the first direction,
    wherein the including of the dynamic allocation information in the MAP includes:
    including a connection identifier that corresponds to a sub-burst to which a dynamic resource is allocated in the MAP;
    including a slot offset of discontinuous slots in the MAP when the slots are not continuously allocated to the sub-burst; and
    including the number of slots that are allocated to the sub-burst in the MAP.

2. The method of claim 1, further comprising
    including information on the radio resource region in the MAP when the radio resource region is not used for previous resource allocation.

3. The method of claim 1, wherein
    the including of the fixed allocation information in the MAP includes:
    including a connection identifier that corresponds to at least one sub-burst to which a fixed resource is allocated in the MAP;
    including the number of slots that are allocated to the at least one sub-burst in the MAP; and
    including the fixed allocation information that is expressed as a toggle pattern in the MAP when the number of the at least one sub-burst is equal to or greater than two or the slots that are allocated to the at least one sub-burst are not continuous.

4. The method of claim 1, wherein
    the including of the fixed allocation information in the MAP includes:
    setting the slot offset to be the position of the second slot and including the same in the MAP when the second slot is not the last slot from among the plurality of slots.

5. A method for a base station to transmit resource allocation information to a mobile station in a mobile communication system, the method comprising:
    transmitting information on a radio resource region of a plurality of slots used for resource allocation to the mobile station;
    fixedly allocating the slots that are not reversely allocated starting from the slot that is provided last when the slots are arranged in the first dimension regarding at least one sub-burst that requires a fixed band for a predetermined time within the radio resource region;
    transmitting a connection identifier of the at least one sub-burst to the mobile station; and
    transmitting information on the slots that are allocated to the at least one sub-burst to the mobile station
    wherein the transmitting of information on the slots that are allocated to the at least one sub-burst to the mobile station includes:
    transmitting the number of slots that are used for the fixed allocation to the mobile station; and
    configuring information on the slots that are allocated to the at least one sub-burst as a toggle pattern and transmitting the same to the mobile station when the number of the at least one sub-burst is equal to or greater than two of the slots that are used for the fixed allocation are not continuous.

6. The method of claim 5, wherein
the transmitting of information in the radio resource region to the mobile station includes:
notifying the mobile station of the fact that the radio resource region is previously used for resource allocation when the radio resource region is previously used for resource allocation; and
transmitting information on the radio resource region to the mobile station when the radio resource region is newly set.

7. The method of claim 5, wherein the transmitting of the connection identifier to the mobile station includes
arranging the connection identifier according to the order for the at least one sub-burst to receive the slot, and transmitting the connection identifier to the mobile station.

8. The method of claim 5, wherein
the configuring as a toggle pattern and transmitting to the mobile station includes:
allocating a corresponding toggle bit to the at least one sub-burst according to the order for arranging the connection identifier; and
generating the toggle pattern by corresponding the toggle bit to the slot used for the fixed allocation.

9. The method of claim 8, wherein
the transmitting of the toggle pattern to the mobile station further includes:
compressing the toggle pattern; and
transmitting the compress toggle pattern to the mobile station.

10. The method of claim 8, wherein
the transmitting of the toggle pattern to the mobile station further includes:
selecting the number of bits of the toggle bit; and
transmitting the number of bits thereof to the mobile station.

11. The method of claim 9, wherein
the allocating of the toggle bit includes
allocating the toggle bits so that the toggle bits of the slots that correspond to two neighboring connection identifiers may be different with each other according to the order of arranging the connection identifiers when 1 is selected as the number of toggle bits.

12. The method of claim 9, wherein
the allocating of the toggle bit includes:
when 2 is selected as the number of toggle bits to form a plurality of toggle bits including a first toggle bit and at least one second toggle bit,
allocating the first toggle bit to the slot that is not allocated to the at least one sub-burst; and
allocating the at least one second toggle bit so that the toggle bits of the slots that correspond to two neighboring connection identifiers according to the order of arranging the connection identifier.

* * * * *